June 26, 1962

D. W. BREES 3,040,516

DETONATIVE COMBUSTION METHOD AND
MEANS FOR RAM-JET ENGINE

Filed Aug. 3, 1959

INVENTOR.
DALE W. BREES
BY Duane C. Bowen
ATTORNEY

INVENTOR.
DALE W. BREES

BY Duane C. Bowen
ATTORNEY

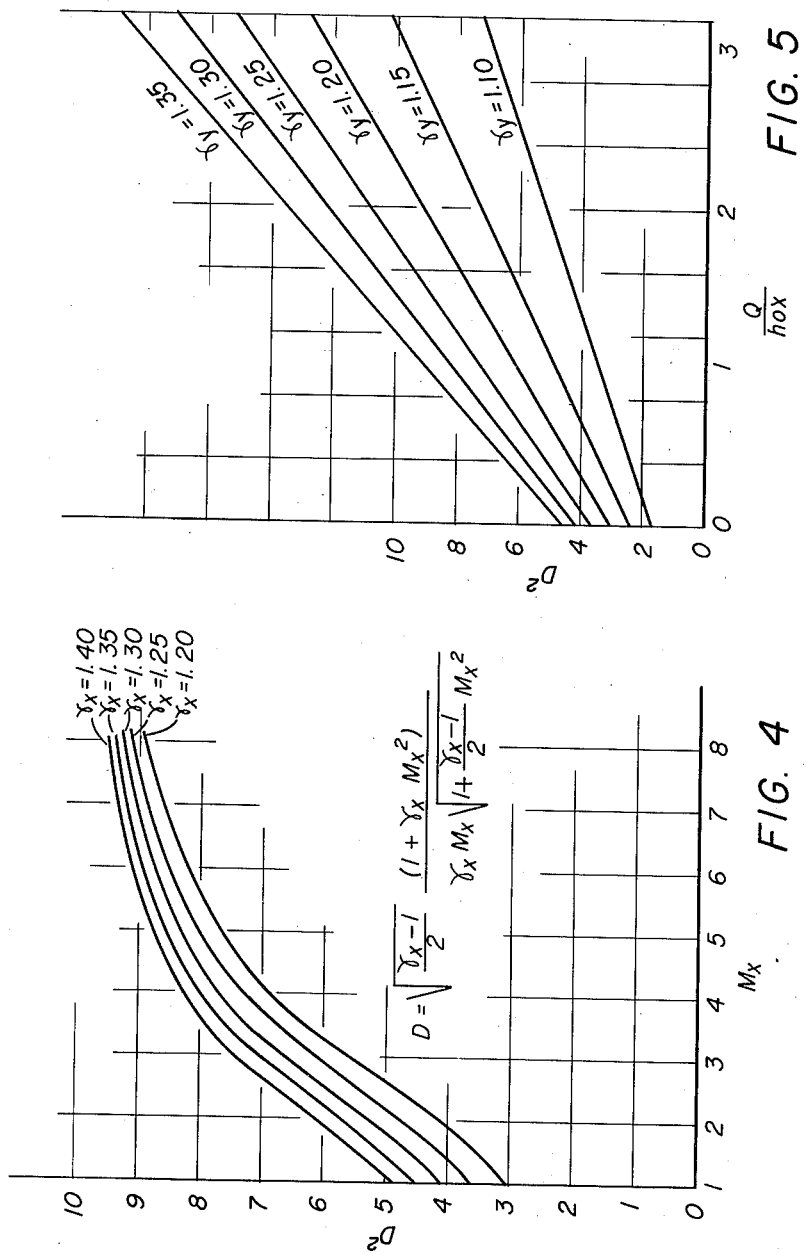

INVENTOR.
DALE W. BREES
BY Duane C. Bowen
ATTORNEY

United States Patent Office 3,040,516
Patented June 26, 1962

3,040,516
DETONATIVE COMBUSTION METHOD AND MEANS FOR RAM-JET ENGINE
Dale W. Brees, Wichita, Kans., assignor to Boeing Airplane Company, Wichita, Kans., a corporation of Delaware
Filed Aug. 3, 1959, Ser. No. 831,153
4 Claims. (Cl. 60—35.3)

My invention relates to a method and means for supersonic ram-jet engine combustion in which a detonation wave is stabilized in the engine inlet duct.

A combustible mixture will detonate under certain conditions and the resulting detonation wave will travel through a combustible mixture at a high velocity. Observations of this phenomenon in constant area channels has established that the detonation wave moves at supersonic velocity relative to the unburned mixture and the burned gases move away from the detonation wave at the local velocity of sound. The latter observation is consistent wtih theoretical predictions of Chapman and Jouguet and such detonations are called Chapman-Jouguet detonations. (Courant, R., and Friedricks, K. O., Supersonic Flow and Shock Waves, Interscience Publishers, Inc., New York, 1948, pp. 204–235.)

It was observed in the publication A Preliminary Study of the Application of Steady-State Detonative Combustion to a Reactive Engine, by Dunlap, R., Brehm, R. L., and Nicholls, J. A. (AFOSR TN 57–657, ASTIA Document No. AD 136–648, September 1957), that an application to supersonic ram-jet combustion is suggested by the fact that detonation waves are propagated at supersonic velocities relative to the unburned mixture. However, the authors proposed the establishment of the detonation wave in the divergent, nozzle portion of the engine. I conceived the idea of stabilizing the detonation wave in the convergent, inlet duct portion of the engine and I discovered that this solves serious problems, notably instability, of the previous proposal. The authors chose to position the detonation wave in the propulsion nozzle as a means of avoiding high total pressure losses across the detonation wave which were thought to occur in higher velocity areas forward of the nozzle. Total pressure losses in shock or detonation waves generally increased with increasing approach velocities. However, I have found that the detonation wave can be positioned in the forward (duct and diffuser) areas because, unobviously, as the engine goes to higher velocities the detonation wave propagation velocity and its associated total pressure loss decreases due to increasing enthalpy of the combustible mixture immediately forward of the detonation wave. An unobvious distinction, hence, was the effect of this increasing enthalpy on total pressure losses across the detonation wave.

My invention, the problems encountered, the improvements over the previous proposal, and the advantages of the system will be best understood from the following more detailed disclosure and discussion.

The objectives of my invention include: to provide a method and means for stable detonative combustion in a supersonic ram-jet engine; to solve the problem encountered in a detonative combustion system; and to provide such a method and means that achieves improved results, including the provision of a smaller, lighter engine, over other systems for powering vehicles in some flight conditions.

Reference is made in the description to the drawings, in which:

FIGURES 2–9 are graphs illustrating various relationships involved in my invention. The graphs show approximate curves and are not intended to be read for exact values.

Figure 1:
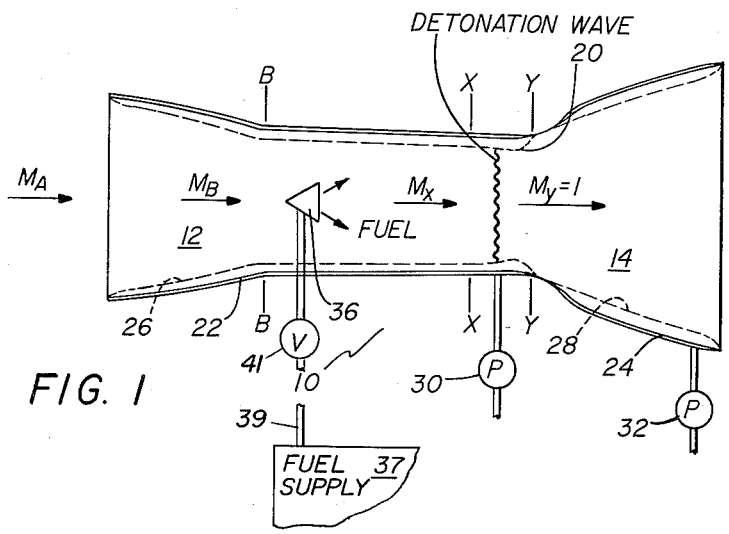
FIGURE 1 is a schematical view of a supersonic ram-jet engine forming a specific embodiment of my invention.

Nomenclature $a$—Local sound velocity (ft./sec.)
$C_p$—Specific heat at constant pressure
$D$—Detonation wave Mach number parameter
$f_a$—Stoichiometric fuel-air ratio
$F_n$—Net thrust (lb.)
$g$—Acceleration of gravity (ft./sec.$^2$)
$h$—Enthalpy (B.t.u./lb.)
$I_{SP}$—Specific impulse (sec.)
$J$—Mechanical equivalent of heat $\left(\frac{\text{ft.}=\text{lb.}}{\text{B.t.u.}}\right)$
$m$—Molecular weight $\left(\frac{\text{lb.}}{\text{lb.}=\text{mole.}}\right)$
$M$—Mach number
$M_x$—Propagation Mach number of a stable detonation wave relative to the unburned mixture
$P$—Pressure (lb./ft.$^2$)
$Q$—Sensible combustion heat release (assume 1510 B.t.u./lb. for stoichiometric $H_2$ and air)
$R$—Gas constant (ft.-lb./lb.-° R.)
$T$—Temperature (° R.)
$u$—Gas flow velocity (ft./sec.)
$W$—Detonation wave propagation velocity relative to unburned mixture (ft./sec.)
$W/A$—Engine air flow (lb./sec.)
$\gamma$—Ratio of specific heats
$\phi$—Equivalence ratio ($f/fs$)
$N_{je}$—Equivalent jet nozzle efficiency
$N_{KE}$—Diffuser kinetic energy efficiency

Subscripts $A$—Ambient (static) condition
$B$—Region upstream of mixing zone
$x$—Region upstream of a stable detonation wave
$y$—Region downstream of a stable detonation wave
$o$—Total or stagnation condition
$S$—Sensible energy only Observation of detonation waves has established that these waves will travel through combustible mixtures at supersonic velocities relative to the unburned mixture. Consideration of such waves has suggested their application to supersonic ram-jet combustion.

According to my invention, a diffuser and the addition of fuel are used to reduce the ram air flow velocity from its free stream value to the propagation velocity of a detonation wave positioned in the diffuser. The performance of the engine is found to be competitive with conventional variable-geometry ram-jets and to be smaller and lighter. One important feature of the system is that the detonation wave propagation velocity decreases with increasing flight Mach number.

The phenomena that occur through a detonation wave is not completely understood by those working in the art. Some researchers consider that a detonation wave is a shock induced deflagration, i.e., Courant and Friedricks supra. In any case, for a Chapman-Jouguet detonation, the variation of the state properties, pressure, temperature, enthalpy, etc., can be described in terms of a flow model consisting of a normal shock wave followed by choked combustion.

A stable detonative combustion can occur when a detonation wave is initiated in a combustible mixture having a flow velocity equal to the detonation wave propagation velocity. A ram-jet engine using this combustion technique is smaller and lighter than a conventional ram-jet because of the elimination of the subsonic diffuser, the subsonic combustion chamber and the convergent portion of the propulsion nozzle.

The predicted total pressure losses occurring across a detonation wave would be so great at high Mach numbers that a preliminary consideration of such a power plant for use at high Mach numbers would not seem reasonable. However, the detonative wave propagation velocity (at a given fuel-air ratio) is found to decrease with increasing static enthalpy of the combustible mixture. (Shapiro, A. H., The Dynamics and Thermodynamics of Compressible Fluid Flow, The Ronald Press Co., New York, volume I, pp. 209–211.) I devised the idea that the propagation velocity of the detonation wave would be reduced to a level giving acceptable total pressure losses by the rising static enthalpy and the diffusion action of a convergent inlet duct when the detonation wave is located rearward of fuel injection in the diffuser. This method reduces the detonation wave total pressure losses as the power plant goes to higher flight velocities. Unobviously, stable detonation waves can be provided by this method for flight velocities greater than the detonation wave propagation velocity.

In the analysis set forth later in the discussion, approximate values of performance are given that may be compared with the performance of other idealized engines. The analysis shows an improvement in ram-jet engine propulsion.

FIGURE 1

FIGURE 1 shows schematically a ram-jet engine 10 embodying my invention. The engine body has a ram air passageway consisting of a convergent portion 12 forming an inlet duct and diffuser and a divergent portion 14 forming an exit nozzle. Fuel injector or burner means 36, located forward of nozzle 14, is supplied with fuel from a fuel supply system. The engine is different from prior ram-jet engines in not having a subsonic combustion chamber, i.e., there is no increased diameter or bulging of the passageway in the area of combustion rearward of fuel injector means 36 and forward of nozzle 14. The engine has a simple convergent-divergent passageway. The possible designs of the passageway and the factors to be considered will be understood by those working in the art in view of the present disclosure. The passageway may have a pronounced flare both in convergent and divergent portions up to the line of joinder, the inner portion of the convergent duct may have only a slight taper (as shown), or the inner duct portion may have no taper and all are defined herein as simple convergent-divergent passageways. At least some tapering in the rearward portion of the inlet duct is desirable, although not necessary, for stability of the detonation wave. The necessary feature is sufficient diffusion (reduction in cross-section) so that the velocity of the combustible mixture in front of the detonation wave is equal to the velocity of the wave. The choice of configuration involves the same considerations appearing in other supersonic inlets, i.e., avoiding undesirable shock wave formations, etc.

The region upstream of the fuel mixing zone is indicated by the letter B, the region upstream of a stable detonation wave is indicated by the letter X, and the region downstream of a stable detonation wave is indicated by the letter Y.

The incoming air is compressed adiabatically from $M_A$ to $M_B$. Adiabatic fuel mixing occurs between stations B and X at supersonic Mach numbers. The mixing further reduces Mach number to $M_X$, which equals the detonation wave Mach number. In order to stabilize the detonation wave more positively, preferably a slight convergence is present, as at 20, aft of the detonation wave so that the wave can not move in a downstream direction.

Stoichiometric combustion of hydrogen and air is used as the specific example. In this case the engine, a hypersonic power plant, can operate only at flight Mach numbers higher than the maximum detonation wave propagation Mach number for stoichiometric hydrogen-air detonation. At lower Mach numbers, other than stoichiometric mixtures would be used. The engine is not limited to the use of hydrogen fuel and will operate nearly as well with other fuels, such as JP4, gasoline, alcohol, and others.

Figure 8:
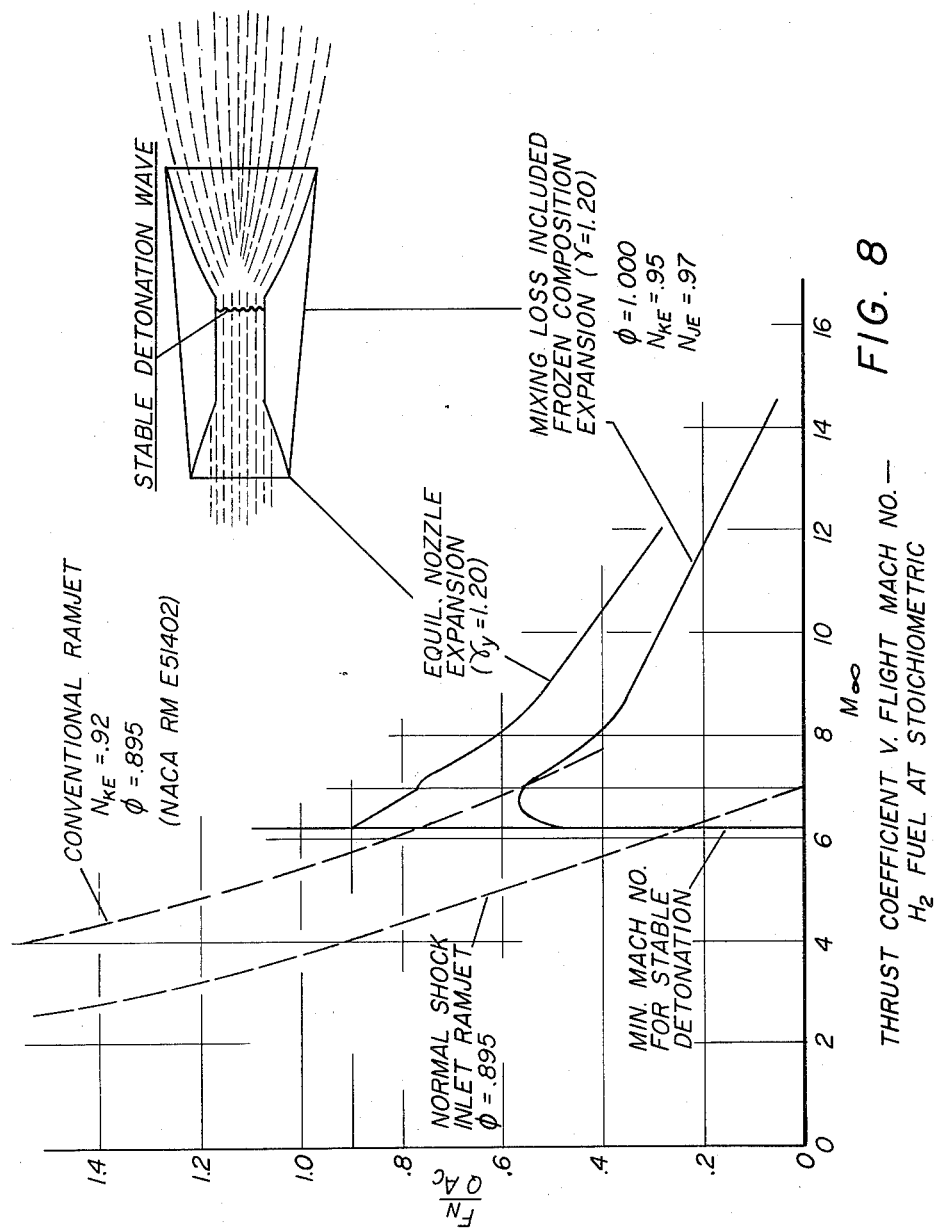

The performance of the present engine, using hydrogen fuel, is compared with conventional type ram-jets in FIGURE 8 and is shown to be competitive in the very high Mach number flight region, e.g., about Mach 6 and above. FIGURE 8 indicates a minimum operating Mach number of approximately 6 for the stable stoichiometric combustion of hydrogen. A stable detonation wave can be achieved at Mach numbers lower than 6 by reducing the fuel-air ratio, or by using other fuels. When gaseous hydrogen is used for fuel, the vehicle picks up all oxygen from the air. This makes a favorable weight comparison with a vehicle using fuel containing oxygen.

FIGURE 8 compares flight Mach number with thrust coefficient and shows a normal shock inlet ram-jet, a conventional ram-jet as shown in NACA RM E51402, and the present system. The equivalence ratios ($\phi$) are respectively .895, .895, and 1.000 but this does not substantially affect the comparison of the graph. The factors $N_{KE}$ and $N_{JE}$ are not sufficiently different to affect the rough comparison of the graph and only part of these are given. Two lines are shown for the present system, the equilibrium nozzle expansion assuming complete equilibrium of the products of combustion during the nozzle expansion and the frozen composition expansion line assuming no change of composition of the products of combustion during the expansion. Actual performance of course would fall somewhere between these lines.

Control of the performance level of the present power plant can be achieved either by control of the fuel-air ratio or by control of the inlet geometry, or by a combination of both. The control at flight numbers below the detonation wave propagation Mach number for stoichiometric combustion can be achieved by variation of the fuel-air ratio. This action may be supplemented by diffusion but diffusion is not a complete substitution at these lower flight numbers. At flight Mach numbers greater than the detonation wave propagation Mach number resulting from a stoichiometric fuel-air ratio (above Mach 6.2 in FIGURE 8, for example), a fixed geometry convergent inlet can be used and control in the engine performance level can be achieved by variation of the fuel-air ratio. Diffuser control may be substituted for fuel-air ratio control at these higher flight numbers or this may be used in conjunction.

New model or type engines of course require extensive control calibration programs and the present engine likewise will require empirical engine control calibration to determine the exact fuel-air ratios and/or diffusion to be used according to flight Mach number, altitude and fuel. Such a calibration program would start with the general factors theoretically involved in fuel-air ratio and diffuser settings and these will be understood by those working in the art in view of the present disclosure. For example, the graphs of FIGURES 4 and 5 define detonation wave propagation Mach numbers and diffusers can be designed following general aerodynamic theory so that the ram air is diffused to equal these Mach numbers immediately forward of the detonation wave. If adjustment is to be obtained by the fuel-air ratio, the diffuser being fixed, variation of Q follows changes in fuel-air ratio in direct proportion. This variation in Q will produce a variation in the detonation wave propagation velocity as shown by FIGURES 4 and 5. Formula 7 below gives the general relationships involved in which, as above indicated, variations in fuel-air ratio change Q in the formula.

Figure 9:
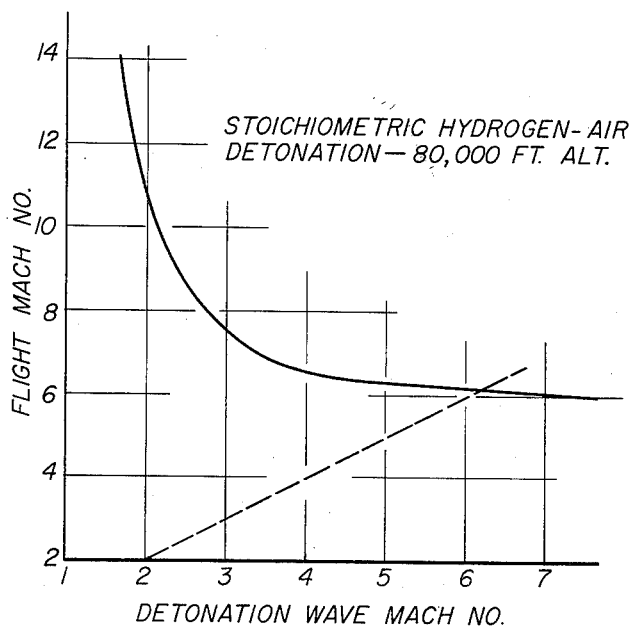

If hydrogen-air detonation is considered at a flight Mach number of 6.5, for example, a fixed geometry diffusion to Mach 2 can be used and the detonation wave propagation can be varied from Mach 2 to Mach 4 within this fixed diffuser by variations in the fuel-air ratio (see FIGURE 9). The detonation wave propagation Mach number would not be increased beyond approximately 4 since this is the propagation Mach number for stoichiometric detonation at a flight Mach number of approximately 6.5, as indicated by FIGURE 9. This FIGURE shows the reduction in detonation wave propagation velocity with increasing flight velocity, the example being with stoichiometric hydrogen-air detonation at 80,000 ft. altitude. The advantage offered by this phenomena is an important feature of my invention as has been before stated.

The inlet diffuser (the portion of the engine from the leading edge to the detonation wave) and the propulsion nozzle may be variable in geometry, as above indicated, using presently available techniques. For example, FIGURE 2 of Patent 2,540,594 is typical of many prior structures which employ translating spike, nozzle plugs and the like to vary passageway areas. A pressure-sensitive flexible lining is used to vary the inlet area of a convergent-divergent diffuser in FIGURES 1 and 2 of Patent 2,737,019. As a specific embodiment, FIGURE 1 of the present disclosure indicates the last-mentioned type of structure in which inflatable linings are indicated at 22 in inlet duct 12 and at 24 in exhaust nozzle 14. An expanded condition of the lines are indicated at 26 and 28 respectively by dotted lines. Pumps, for applying pressurized fluid to the lines from a supply reservoir, are shown at 30 and 32. The techniques for manufacturing the linings so as to have proper configuration in expanded conditions are well known. The linings are designed to maintain, when expanded, the maximum constriction at 20.

The control means for varying the fuel-air ratio (by controlling rate of fuel supply through fuel injection means 36) and/or for varying the duct and nozzle geometries will be understood by those skilled in the art and may be one of a number of automatic, semi-automatic or manual systems in which the needed action is initiated or indicated by means, that may be external of the engine, sensing vehicle Mach number in the free air stream. The essential action in diffuser adjustment is to vary the ratio of the leading edge cross section of inlet duct 12 to the duct cross section at the detonation wave. As will be understood by those working in the art, it is desirable in diffuser and nozzle adjustment to vary the complete inlet duct and exit nozzle configuration, if structure is not unduly complicated, for purposes of efficient operation. The factors affecting inlet duct and nozzle design, operation and efficiency are the same as those applying to other jet engines or the different factors will be understood by those working in the art in view of the information set forth herein. The purpose of varying the nozzle configuration is to maximize efficiency at various nozzle velocities.

*Operation*

The general operation of the engine according to the present invention will be described before it is analyzed in detail.

The incoming engine air is reduced in Mach number from the flight Mach unmber to the detonation wave propagation Mach number resulting from a particular controlled fuel-air ratio. The equalization of Mach numbers between the combustible fuel-air velocity and the detonation propagation velocity may be achieved by adjusting the diffusion action in the inlet or by adjusting the fuel-air ratio or from a combination of both. Since the local flow velocity is equal in magnitude to the detonation wave propagation velocity, a stabilized detonation wave occurs across which combustion takes place. The hot gases then expand supersonically from the propulsion nozzle, thereby developing thrust.

Since the detonation wave will stand in a region which possesses a flow velocity equal to the detonation wave propagation velocity, the detonation wave will be stable. The detonation wave can not move in an upstream direction because it would enter a region with a flow velocity in excess of its propagation velocity since the diffusion process is a flow deceleration process. The detonation wave can not move in a downstream direction unless the minimum flow velocity in the inlet diffuser exceeds the detonation wave propagation velocity resulting from a particular fuel-air ratio. The engine configuration is designed so that the minimum diffuser flow velocity is slightly less than the detonation wave propagation velocity. If the detonation wave were initiated in the propulsion nozzle, it would tend to move upstream since the flow velocity upstream of the detonation is lower than the flow velocity at the detonation wave location because the propulsion nozzle is a flow accelerating device. The foregoing means that the detonation wave is stable, an important feature of my invention.

An analysis of the detonation wave phenomenon discloses that the detonation wave propagation velocity decreases with increasing flight velocity and approaches a limiting value of one when the flight Mach number is nearly infinite. This is a fortunate occurrence since the total pressure losses due to fuel mixing and detonative combustion are nearly exponentially decreased with decreasing Mach numbers.

As a result, the incoming flow is diffused to lower Mach numbers when the flight Mach number is increased, and the efficiency of the mixing and detonative combustion process of the engine increases. This is an additional novel feature of the present stable detonative combustion ram-jet system.

My ram-jet engine provides the following additional advantages over prior subsonic combustion ram-jets: (1) simplification of the supersonic inlet since the incoming air need not be diffused to a subsonic flow velocity; (2) reduction of inlet losses due to all-supersonic operation; (3) reduction of engine weight due to elimination of the conventional ram-jet subsonic diffusers, large cross-sectional area combustion chambers, and convergent portions of propulsion nozzles; (4) achievement of a maximum energy release rate per unit burner cross-sectional area; (5) increase in engine thrust to weight ratios; (6) reduction in gas static temperature due to the all-supersonic operation of the power plant.

Although the present engine could be designed for more than one type of combustion, i.e., a pulse type detonative combustion at Mach numbers lower than those feasible with a stable, normal detonative combusion wave, it appears preferable at present to use an auxiliary system to bring the vehicle to hypersonic velocities. A rocket could be used for such an auxiliary engine.

To review some important features of the invention: (1) Stable detonation wave type combustion is achieved in a suitably shaped inlet of a simple convergent-divergent ram-jet. The incoming supersonic stream is reduced in velocity by a suitable method to a lower velocity that is equal to the detonation wave propagation velocity resulting from a particular fuel-air ratio. Since the detonation wave propagation velocity equals the local flow velocity, a stable wave results. (2) The engine utilizes the natural phenomenon that detonation wave propagation velocities decrease with increasing flight velocities. By this means, engine efficiencies increase with increasing flight velocities. (3) Stable detonative combustion power plant performance level is controlled by variations in the inlet geometry and/or by variations in the fuel-air ratio. (4) The capabilities of a stable detonative combustion ram-jet is utilized to achieve a smaller, lighter weight, less complex power plant.

*Analysis*

The following are an analysis and various specific examples of my invention:

Assuming all detonations to be of the Chapman-Jouguet type, the following relationships are derived for a stable wave from the conservation laws and the equation of state for the fluid (Nicholls, J. A., Wilkinson, H. R., and Morrison, R. B., "Intermittent Detonation as a Thrust-Producing Mechanism," Jet Propulsion, May 1957, pp. 534–541), (1) $$P_y/P_x = \frac{1+\gamma_x M^2_x}{1+\gamma_y}$$

(2) $$T_y/T_x = \frac{m_y \gamma_y}{m_x \gamma_x} \frac{1}{M^2_x} \left[\frac{1+\gamma_x M^2_x}{1+\gamma_y}\right]^2$$

(3) $$P_{oy}/P_{ox} = \left[\frac{1+\gamma_x M_x^2}{1+\gamma_y}\right] \frac{\left(\frac{\gamma_y+1}{2}\right)^{\gamma_y/\gamma_y-1}}{\left(1+\frac{\gamma_x-1}{2}M^2_x\right)^{\gamma_x/\gamma_x-1}}$$

The energy equation across the combustion discontinuity can be expressed as (see Dunlap, et al., supra), (4) $$\frac{a^2_x}{\gamma_x-1}\left(1+\frac{\gamma_x-1}{2}m^2_x\right) + gJQ = \frac{a^2_y}{\gamma_y-1}\left(1+\frac{\gamma_y-1}{2}M^2_y\right)$$

Since $M_y = 1$ in a stable Chapman-Jouguet detonation, Equation 4 reduces to, (5) $$\frac{2}{\gamma_x-1}a^2_{ox} + 2gJQ = a^2_y \left(\frac{\gamma_y+1}{\gamma_y-1}\right)$$

where $a_o$ is the speed of sound at the stagnation temperature. (It is assumed here that $h = C_p T$ and $$C_p = \frac{R}{J}\left[\frac{\gamma}{\gamma-1}\right])$$

From the continuity equation written across the detonation, the Mach number definition and Equation 1, one obtains, (6) $$\frac{\gamma_x M_x}{a_x} = \frac{\gamma_y}{a_y}\left(\frac{1+\gamma_x M_x^2}{1+\gamma_y}\right)$$

Combining Equations 5 and 6 and rearranging results in the following relationship between the stable detonation wave Mach number ($M_x$), the upstream and downstream ratios of specific heat ($\gamma_x$ and $\gamma_y$), the combination heat release (Q) and the upstream stagnation enthalpy ($h_{ox}$), (7) $$\sqrt{\frac{\gamma^2_y-1}{\gamma^2_y}\left[\frac{2}{\gamma_x-1}(1+Q/h_{ox})\right]}^{1/2} = \frac{1+\gamma_x M^2_x}{\gamma_x M_x \sqrt{1+\frac{\gamma_x-1}{2}M^2_x}}$$

Figure 2:
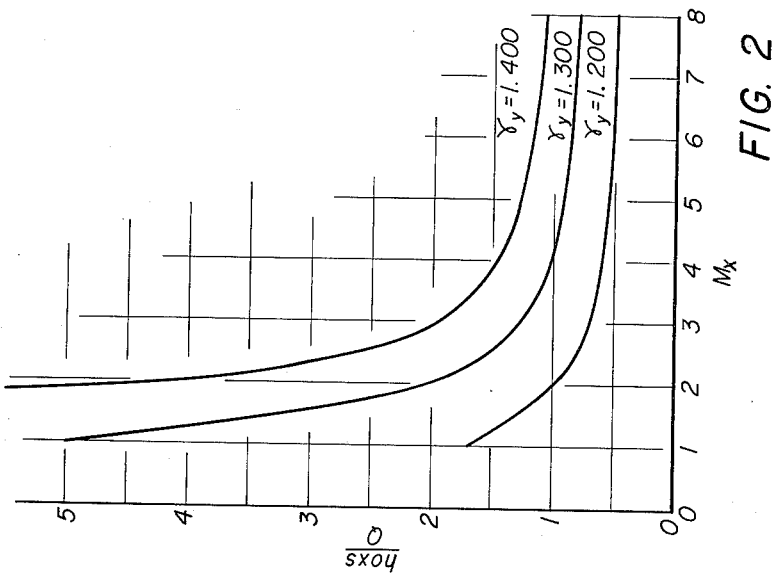

FIGURE 2 presents solutions of Equation 7 with $\gamma_x = 1.40$ and $\gamma_y = 1.40$, 1.30, and 1.20.

The total enthalpy at x can be expressed as:

(8) $$h_{ox} = \frac{h_{oa} + f_s h_o}{1 + f_s}$$

where $f_s$ is the fuel-air ratio and is equal to 0.02928 for a stoichiometric mixture.

Assuming that a hydrogen fuel of a stagnation enthalpy of 300 B.t.u./lb. is used, and that the thermal conditions for air at an altitude of 80,000 ft. are generally applicable, Equation 8 reduces to, (9) $$h_{ox} = 99.2 + 18.2 M^2_A$$

For stoichiometric combustion of hydrogen and air, Q is approximately 1510 B.t.u. per lb. of mixture, so

(10) $$h_{ox/Q} = 0.066 + 0.012 M^2_A$$

Figure 3:
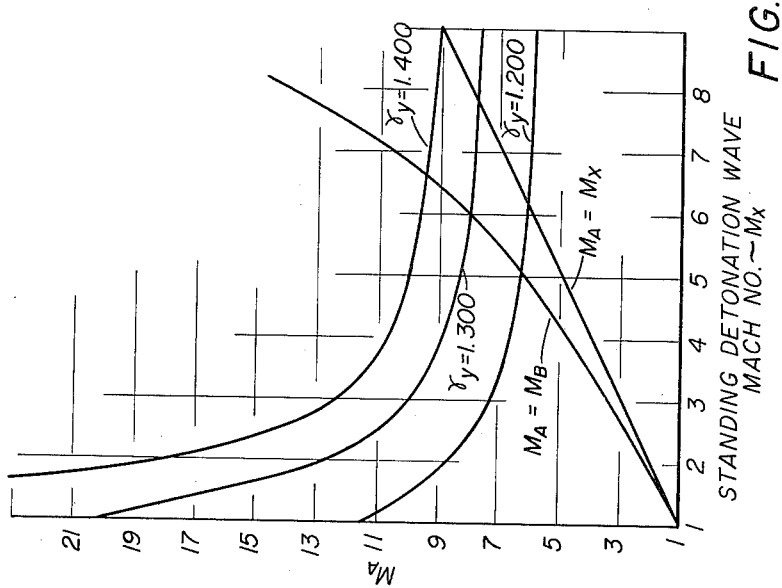

Equations 10 and 7 were used to calculate detonation wave Mach numbers in terms of flight Mach numbers. These results are shown in FIGURE 3.

For a mean value of $\gamma$ across the detonation, Shapiro et al., supra, gives the following equation,

(11) $$h_x/Q = \frac{2(\gamma_m+1)M_x^2}{(1-M^2_x)^2}$$

Since, $$h_x = \frac{h_{ox}}{1+\frac{\gamma_m-1}{2}M^2_x}$$

for a stable detonation wave, Equation 11 will reduce to,

(12) $$\frac{h_{ox}}{Q} = \frac{2(\gamma_m+1)M^2_x\left(1+\frac{\gamma_m-1}{2}M^2_x\right)}{(1-M_x^2)^2}$$

Equation 12 can also be evaluated from Equation 7 using a mean value of $\gamma$.

The straight line defined as $M_A = M_x$ on FIGURE 3 separates the region of possible stable waves from the region of transient waves. Above this line a stable detonation wave is possible since the approach Mach number exceeds the detonation Mach number. It would be necessary to diffuse $M_A$ down to $M_x$ in this upper region. However, this diffusion process aids in producing a stable wave since the detonation would face a positive velocity gradient in the upstream direction.

Since a fuel mixing process is necessary between $M_B$ and $M_x$ in order to have combustion, the minimum possible flight Mach number is equal to $M_B$. As a result, a supersonic mixing analysis was made assuming that the hydrogen fuel is injected normally to the air stream and the curve labeled $M_A = M_B$ on FIGURE 3 was obtained. It is apparent that the stable detonation wave operating region lies above this curve.

Because a diffusion from high $M_A$ values to $M_B$ values near one produces a large increase in static temperature, $\gamma_x$ is less than 1.40. Thus FIGURES 2 and 3, calculated for the condition $\gamma_x = 1.40$, are not realistic for high flight Mach numbers. In order to account for the variation in $\gamma_x$, the curves shown in FIGURES 4, 5, and 6 were calculated. These permit a more exact calculation of $M_x$ for variable ratios of specific heats upstream of the detonation wave.

The analysis is simplified if it is assumed that the products of detonative combustion are frozen and the ratio of specific heats remains constant during the subsequent expansion process. These assumptions are conservative since recombination and increasing $\gamma$ values in the nozzle should increase thrust output.

Figure 7:
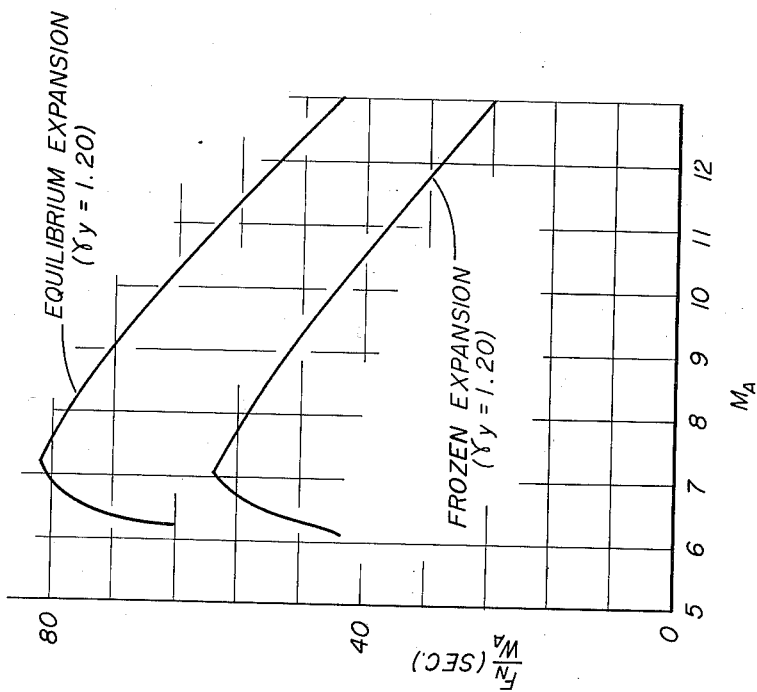

FIGURE 7 presents the theoretical performance of a stoichiometric hydrogen-air ram-jet operating with a stable detonation wave in the inlet. Since the diffuser will be completely supersonic, a kinetic energy efficiency of 95% was assumed for its operation. A jet efficiency ($N_{je}$) of 97% was assumed for the frozen composition expansion at a constant ratio of specific heats ($\gamma_y$) of 120. The performance resulting from equilibrium jet nozzle expansion was also evaluated and is presented by FIGURE 7. In the equilibrium performance analysis it was necessary to assume a $\gamma_y$ value in order to define $M_x$ values (see FIGURES 4 and 5).

Figure 6:
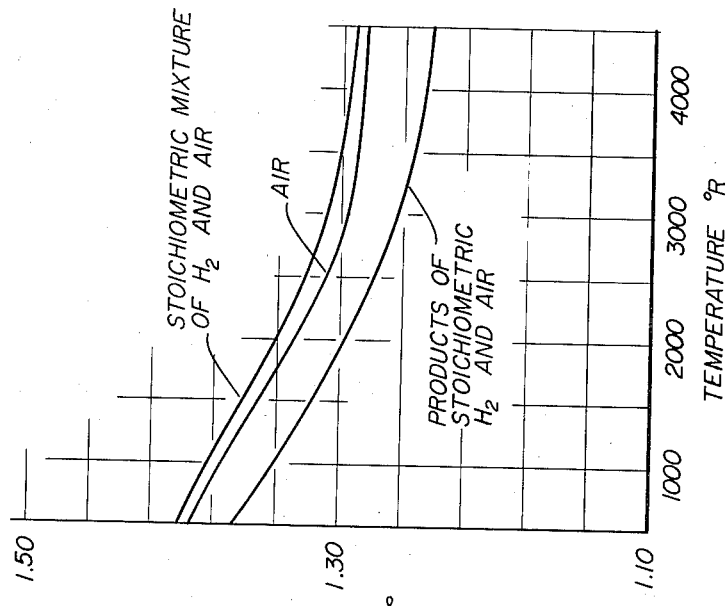

The performance was calculated with the aid of FIGURES 4, 5, and 6. The reduction in $\gamma_x$ at the higher $M_A$ values was evaluated by an iterative process. Because of this reduction in $\gamma_x$ due to the temperature rise in the diffuser, it appears that $M_x$ would not become equal to one even near an infinite $M_A$ value. Thus, the detonation wave would not blow out at flight Mach numbers greater than 11.5 as FIGURE 3 would indicate.

The effect of the diffuser inefficiency on the performance becomes increasingly important at high Mach numbers. The supersonic mixing process produces a loss in total pressure which was taken into account. This effect is the greatest at the lowest flight Mach number and becomes less important at high Mach numbers since mixing occurs after diffusion.

FIGURE 7 indicates that the detonation wave would be unstable below $M_A = 6.2$. Below this Mach number, a pulsating combustion would occur since the detonation wave Mach number exceeds the flow Mach number. An analytical study of this area of operation was made. A stable detonation wave is achieved in this flight regime by reducing the fuel-air ratio (see FIGURES 4 and 5); however, this results in a reduction in performance.

Having thus specifically described my invention, I do not wish to be understood as limiting myself to the precise details of construction shown, but instead wish to cover those modifications thereof that will occur to those skilled in the art from my disclosure and that fairly fall within the scope of my invention, as described in the following claims.

I claim:

1. The method of vehicle propulsion by means of a supersonic ram-jet engine having a convergent-divergent ram air passageway, comprising: bringing said vehicle to an operating supersonic velocity, injecting fuel in said passageway forward of the divergent portion of said ram air passageway, and forming and stabilizing a detonation combustion wave in said ram air passageway forward of said divergent portion of said passageway and rearward of the location where said fuel is injected by adjusting the relationship between the detonation wave propagation velocity, resulting from the fuel-air ratio, and the flow velocity in the combustible fuel-air mixture immediately in front of the detonation wave, resulting from the contour of said ram air passageway, so that they are substantially equal.

2. The method of vehicle propulsion by means of a supersonic ram-jet engine having a convergent-divergent ram air passageway, comprising: bringing said vehicle to an operating supersonic velocity, injecting fuel in said passageway forward of the divergent portion of said ram air passageway, and forming and stabilizing a detonation combustion wave in said ram air passageway forward of said divergent portion of said passageway and rearward of the location where said fuel is injected by adjusting the relationship between the detonation wave propagation velocity, resulting from the fuel-air ratio, and the flow velocity in the combustible fuel-air mixture immediately in front of the detonation wave, resulting from the contour of said ram air passageway, so that they are substantially equal, by adjusting said contour of the convergent portion of said passageway thereby adjusting said flow velocity.

3. The subject matter of claim 2 in which the fuel is hydrogen and the fuel-air ratio is stoichiometrical.

4. The method of vehicle propulsion by means of a supersonic ram-jet engine having a convergent-divergent ram air passageway, comprising: bringing said vehicle to an operating supersonic velocity, injecting fuel in said passageway forward of the divergent portion of said ram air passageway, and forming and stabilizing a detonation combustion wave in said ram air passageway forward of said divergent portion of said passageway and rearward of the location where said fuel is injected by adjusting the relationship between the detonation wave propagation velocity, resulting from the fuel-air ratio, and the flow velocity in the combustible fuel-air mixture immediately in front of the detonation wave, resulting from the contour of said ram air passageway, so that they are substantially equal, by adjusting said fuel-air ratio thereby adjusting said detonation wave propagation velocity.

References Cited in the file of this patent

UNITED STATES PATENTS

| | | |
|---|---|---|
| 2,409,433 | Hunter | Oct. 15, 1946 |
| 2,692,480 | Viaud et al. | Oct. 26, 1954 |
| 2,763,426 | Erwin | Sept. 18, 1956 |
| 2,850,873 | Hausmann | Sept. 9, 1958 |
| 2,911,787 | Barry | Nov. 10, 1959 |
| 2,914,915 | Sziklas | Dec. 1, 1959 |
| 2,992,527 | Masnik et al. | July 18, 1961 |

OTHER REFERENCES

Aviation Week, Jan. 6, 1958, page 57.

SAE Transactions, volume 66, 1958, pages 496–498 and 508.